Jan. 4, 1966     R. R. CLARK     3,227,364

VOTING MACHINE SYSTEM

Filed Dec. 31, 1962     7 Sheets-Sheet 1

FIG. 1

INVENTOR.
RUEL R. CLARK
BY
HIS ATTORNEY

FIG. 2

INVENTOR.
RUEL R. CLARK

Jan. 4, 1966  R. R. CLARK  3,227,364

VOTING MACHINE SYSTEM

Filed Dec. 31, 1962  7 Sheets-Sheet 3

FIG. 3

INVENTOR.
RUEL R. CLARK
BY M. Ralph Shaffer
HIS ATTORNEY

Jan. 4, 1966  R. R. CLARK  3,227,364
VOTING MACHINE SYSTEM
Filed Dec. 31, 1962  7 Sheets-Sheet 4

FIG. 4

FIG. 5 (ONE GROUP)

FIG. 6
RELAY SEQUENCE CHART

INVENTOR.
RUEL R. CLARK
BY *M. Ralph Shaffer*
HIS ATTORNEY

Jan. 4, 1966  R. R. CLARK  3,227,364
VOTING MACHINE SYSTEM
Filed Dec. 31, 1962  7 Sheets-Sheet 5

INVENTOR.
RUEL R. CLARK
BY
HIS ATTORNEY

Jan. 4, 1966   R. R. CLARK   3,227,364
VOTING MACHINE SYSTEM
Filed Dec. 31, 1962   7 Sheets-Sheet 6

FIG. 8A

INVENTOR.
RUEL R. CLARK
BY M. Ralph Shaffer
HIS ATTORNEY

Jan. 4, 1966     R. R. CLARK     3,227,364
VOTING MACHINE SYSTEM
Filed Dec. 31, 1962     7 Sheets-Sheet 7

```
CHOICE       Q A B C D E F
D 1          1 0 0 0 0 0 1
R 1          0 0 0 0 0 1 0
O 1          0 0 0 0 0 1 1
D 2          1 0 0 0 1 0 0
R 2          0 0 0 0 1 0 1
O 2          0 0 0 0 1 1 0
D 3          1 0 0 0 1 1 1
R 3          0 0 0 1 0 0 0
O 3          0 0 0 1 0 0 1
              :         :
              :         :
D 21         1 1 1 1 1 0 1
R 21         0 1 1 1 1 1 0
O 21         0 1 1 1 1 1 1
NOT ASSIGNED 0 0 0 0 0 0 0
             0 1 1 1 0 0 0  G ⎤
             0 1 1 0 0 1 1  H ⎬ LAST 3 FLIP-FLOPS
             0 1 0 1 0 1 0  I ⎦
CLOCK OUT    S Q A B C D E F
             P
             A
             C
             E
```

0's DENOTE A NEGATIVE PULSE.
1's DENOTE A POSITIVE PULSE.

PULSES SENT IN CONTINUOUS TRAIN. E. G.— 
                                                      1 1 0 1 1 0 1 1 1

FIG. 8B

INVENTOR.
RUEL R. CLARK
BY M. Ralph Shaffer
HIS ATTORNEY

United States Patent Office 3,227,364
Patented Jan. 4, 1966

3,227,364
VOTING MACHINE SYSTEM
Ruel R. Clark, Salt Lake City, Utah, assignor, by mesne assignments, to Valmont Corporation, Salt Lake City, Utah, a corporation of Utah
Filed Dec. 31, 1962, Ser. No. 248,430
9 Claims. (Cl. 235—50)

The present invention relates to voting machine systems and, more particularly, to a new and improved, electronic voting machine system, and components therefor, which will take advantage of electronic circuitry and computing techniques in reducing size, weight and cost of voting machines, and providing instant, accurate read-out and proof, and which will insure that large districts and combinations of districts may be accommodated with a minium of cost and personnel, and this with optimum accuracy and rapid speed of operation.

Accordingly, an object of the present invention is to provide an improved voting machine system.

A further object of the present invention is to provide a new and improved voting panel usable in an electronic voting machine system.

A further object is to provide usable, rapidly operating components for electronic voting machine systems, which are usable both therein and in other contexts.

A further object of the invention is to provide a new type of voting machine system based on electronic counting techniques for insuring rapid read-out of election results, a miniumum personnel requirement, reliability, and low cost of manufacture.

A further object of the invention is to provide an electronic voting system and voting panel therefor which can be easily understood by the public as to mode of actuation, and which can give fool-proof performance during election periods.

A further object of the invention is to provide an electronic voting machine system adapted for sequential voting panel sampling and automatic counting, the latter by digital computer techniques.

A further object of the invention is to devise a multivibrator circuit which can be conveniently triggered and which, further, may be supplied capacitor means for ensuring condition on the "off" side of the multivibrator once power is applied the circuit.

A further object of the invention is to provide an electronic voting machine system for smaller district areas wherein electromechanical counters are utilized in a sequential, panel sensing system.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 4 is a schematic diagram of an optional circuit which may be used in lieu of a portion of a circuit in FIGURE 3; FIGURE 4 represents, schematically, typical connections which may be employed for certain electrical leads in order to allow a voter to vote for one of two candidates and to achieve party exclusion during primary voting contests.

Figure 1:
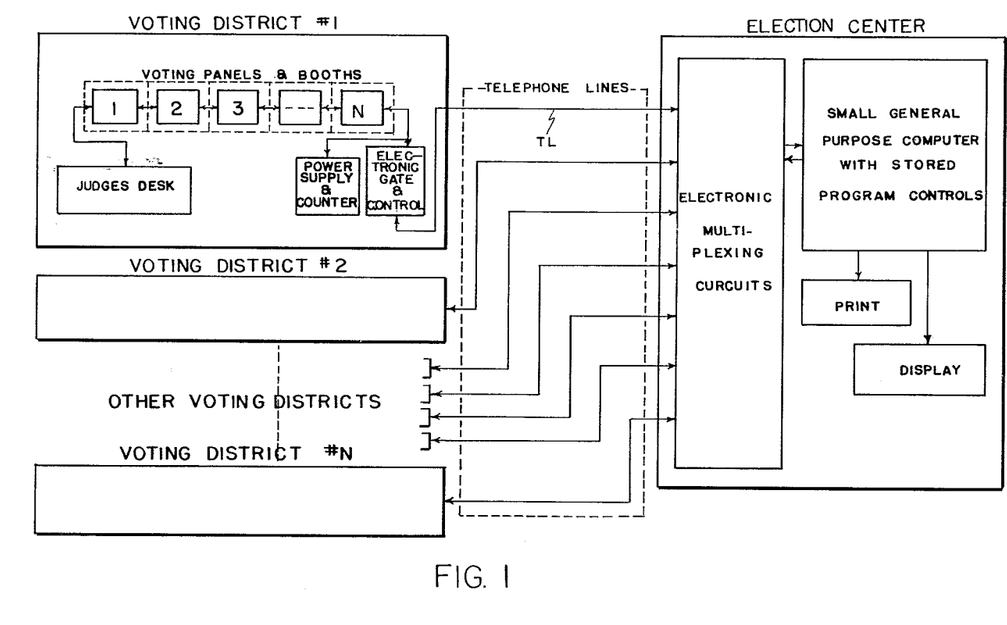
FIGURE 1 is a schematic block diagram of one type voting machine system which may be utilized in accordance with the principles of the present invention.

In FIGURE 1 representative voting district No. 1 is seen to include a plurality of voting booths each having a respective panel designated 1, 2, 3, 4, and 5. These are respectively interconnected by suitable cabling to each other and to a judge's desk unit, and also to a certain power supply and counter, and electronic gate and control, as indicated. Respective telephone lines TL interconnect the outputs from its several voting district systems to certain electronic multiplexing circuits of the election circuit, the latter being suitably connected to a small general purpose computer with stored program controls, and the latter leading to a certain print and display system. This will be described more fully later.

Figure 2:
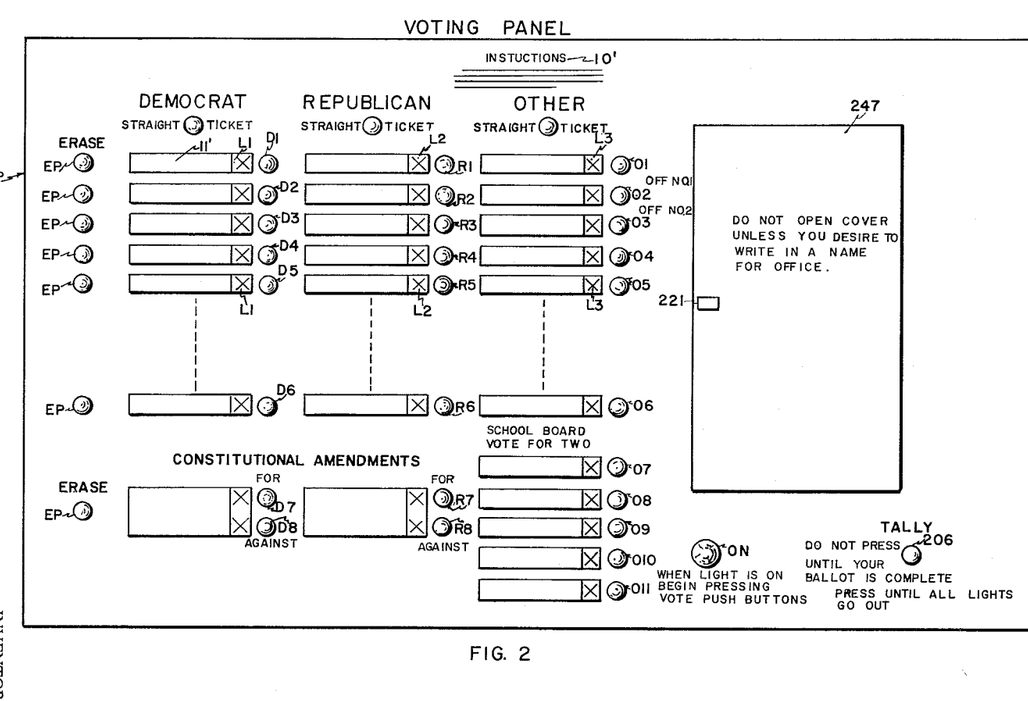
FIGURE 2 is a front elevation of a representative voting panel designed for disposition in a respective one of the several voting booths of a particular voting district.

FIGURE 2 is an elevation of a representative voting panel which in fact comprises a reset ballot, i.e., a voting ballot that is resettable for subsequent use. Instructions at 10' are printed on the panel to guide the voter in the use thereof. Candidates names are depicted at the various rectangles 11', selection pushbuttons D1–D5, R1–R5, 01–05 are employed so that a particular candidate may be selected upon depression of these spring-loaded pushbuttons, and erase buttons EP may be depressed if a voter decides after depression of a particular candidate selection pushbutton that he wishes to vote for no candidate for that office. As will hereinafter be shown, the circuits for a particular office No. 1, represented in horizontal candidate line, are so interconnected that if a voter decides to change his vote from one candidate of one party to a candidate of another party, this prior to depression of the tally button which transmits his vote to a counting circuit, then the voter simply depresses the pushbutton of the latter candidate selected. This automatically erases the vote for the first candidate. Suitable lights or lamps L1, L2 and L3 are disposed behind translucent "X" windows adjacent the names of the respective candidates so that the voter may easily perceive how he has voted upon depression of particular pushbuttons. The lamps L1, L2, or L3 will light depending upon the particular candidate selected for this office No. 1. The voting panel as is hereinafter described accommodates constitutional amendments, multiple voting for primary office, multiple voting for school boards in final elections, write-in candidates, and so on.

Figure 3:
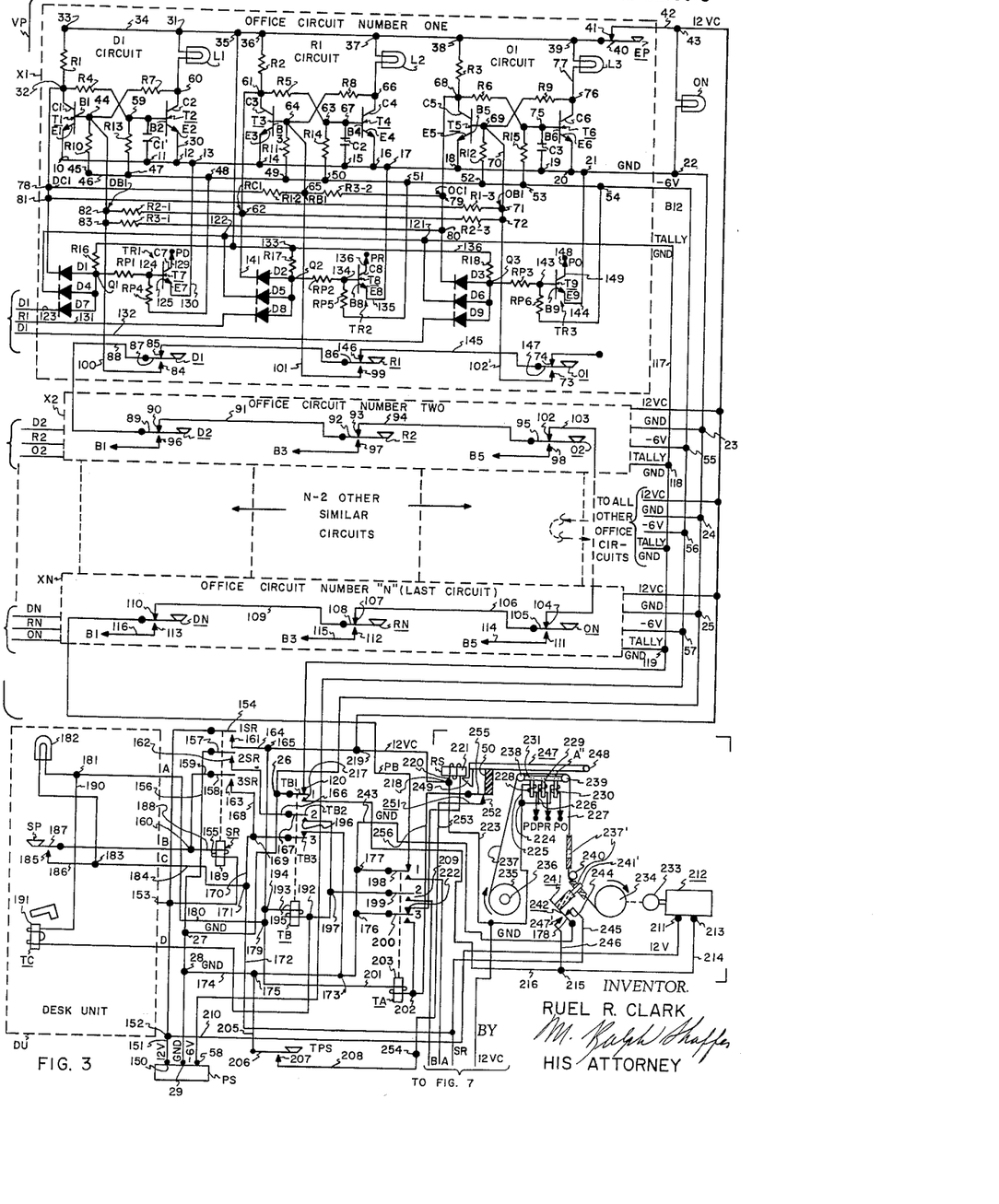
FIGURE 3 is a combination electronic and electromechanical schematic diagram, partially in block form, of representative electrical wiring and components of a respective voting panel, together with additional equipment such as the write-in platen system and voting judge's desk unit which are used in conjunction therewith and with all other panels of a particular district.

FIGURE 3 will now be considered in detail. Emitter E1 of transistor T1 is connected by lead 10 to junctions 11, 12, 13, and 14–28, and also to terminal 29 of power supply PS. Terminal 29 is the ground or common reference potential terminal of power supply PS. Capacitor C1' is connected between junction 11 and base B2 of transistor T2. Emitter E2 is directly connected to junction 12 by lead 30. Collector C2 is coupled through light L1 to junction 31. One type of incandescent lamp which may be used for light L1 is the GE53, manufactured by the General Electric Company of New York. Such a lamp is a light of a low resistance character prior to incandescence. Collector C1 is directly coupled to junction 32 which serves as an end terminal of resistor R1. Remaining end terminal 33 is directly connected by lead 34 to junctions 31 and 35–39 and finally to normally closed, erase pushbutton arm 40 of the erase pushbutton EP. Contact 41 of erase pushbutton EP is connected by lead 42 to junction 43. Resistor R10 forms a junction with base B1 at 44. The remaining end terminal 45 of resistor R10 is coupled by lead 46 to junctions 47, 48, and to junctions 49–57 to terminal 58 of power supply PS. This line of junctures connecting to terminal 58 forms a 6-volt transistor bias supply. Returning to the upper left hand corner of the figure, it is seen that resistor R4 is connected between junctions 32 and 59, and resistor R13 connected between junctions 59 and 47. Resistor R7 is connected between junctions 44 and 60, the latter being the junction also between light L1 and collector C2. Connected to junction 61 are collector C3 of transistor T3 and also junction 62 and resistors R2 and R5. The remaining side of resistor R5 is connected to junction 63, and resistor R14 is coupled between the latter and junction 50. Emitter E3 of transistor T3 is directly connected to junction 14 as shown. Resistor R11 is connected between junction 64 and junction 49. Junctions 64 and 65 are directly connected together as indicated. Resistor R8 is directly connected between junction 66 and junction 64. Collector C4 of transistor T4 is directly connected to junction 66. Capacitor C2 is coupled between junctions 67 and 15. Resistor R5 is coupled between junctions 61 and 63. Light L2 is directly connected between junctions 37 and 66, and comprises a light similar to the light of lamp L1. Resistor R3 is coupled between junction 38 and junction 68, and the latter is directly connected to junction 79, and emitter E4 of transistor T4 is directly connected to junction 16. Base B4 of transistor T4 is directly connected to junction 67; correspondingly, base B5 of transistor T5 is directly connected to junction 69. Resistor R12 is coupled between junction 69 and 52, and lead 70 is connected from junction 69 to junctions 71, 72 to contact 73 of pushbutton O1. Contact 74 of pushbutton 01 has no connection, as indicated, unless additional flip-flop circuits are included. Resistor R6 is coupled between junctions 76 and 69. Collector C6 is directly connected to junction 76, and the latter lead by a lead 77 to light L3 and thence to junction 39. Light L3 may resemble the former lights L1 and L2 previously described. Capacitor C3 is coupled between base B6 of transistor T6 and junction 19. Base B6 is directly connected to junction 75. Resistor R15 is directly connected between junctions 75 and 53. An "on" lamp ON is coupled between junctions 43 and 22, and may take the general form of the lamps L1–L3. Resistor R1-2 is coupled between junction 78 and junction 65. Junction 78 is directly connected to junction 32. Resistor R3-2 is coupled between junctions 65 and 79. Junctions 79 and 80 are directly tied together. Junction 81 is directly connected to junction 78, and resistor R1-3 is coupled between junctions 81 and 71. Correspondingly, resistor R2-3 is directly coupled between junctions 62 and 72. Junctions 82, 83, and electrical contact 84 of pushbutton D1 are directly connected to junction 44 as indicated. The remaining contact 85 of pushbutton D1 is directly connected to arm 86 of pushbutton R1. Arm 87 is connected by lead 88 to arm 89 of pushbutton D2. Electrical contact 90 of pushbutton unit D2 is connected by lead 91 to arm 92 of pushbutton R2. Electrical contact 93 is connected by lead 94 to arm 95 of pushbutton O2. Electrical contacts 96, 97, and 98 are directly connected to the several individual bases B1, B3, B5 in their respective flip-flop circuits (not shown) in office circuit No. 2, and contacts 84, 99, and 73 are connected to the bases of the transistors T1, T3, and T5 of office circuit No. 1. These latter connections are facilitated by leads 100, 101, and 102' respectively. Thus, the circuit X2 will simply be an additional circuit, a circuit for office No. 2, which is identical to the circuit X1 enclosed in the dotted line block. If circuit X1 is designated as circuit number 1, circuit X2 designated as circuit number 2 (identical to #1) then, for additional offices on the ballot there will be additional circuits. For a number N of offices, there will be a corresponding number N of circuits corresponding to circuit X1. Hence, electrical contact 102 will be coupled by lead 103 serially through N–2 other similar circuits to electrical contact 104 of pushbutton switch ON, ultimately, of the last ("N") circuit XN. Contact arm 105 is connected by lead 106 to electrical contact 107 of pushbutton switch RN. Contact arm 108 of pushbutton RN will be connected by lead 109 to electrical contact 110 of pushbutton DN. Electrical contacts 111, 112, 113 are electrically connected by their respective leads 114, 115, and 116 to bases B1, B3, and B5, respectively, of the transistors T1, T3, and T5 of office circuit No. N as correspond to those shown in circuit X1.

The tally ground line 117 directly inter-connects junctions 118, 119, electrical contact 120 of tally relay TB, and also junctions 121, 122, and diode D4. The remaining side of diode D4 is directly connected to junction Q1. Diode D1 is coupled between junction 81 and Q1. Diode D7 is interposed between junction Q1 and the counter unit hereinafter described by lead 123. Junction Q1 is connected through resistor RP1 to junction 124, and the latter is directly connected to base 125 of transistor T7 and also through resistor RP4 to junction 48. Collector C7 of transistor T7 is connected by a lead 129 to common terminal PD (shown in two places for convenience of illustration), to the punch solenoid hereinafter described. Emitter E7 is connected by lead 130 to junction 13. Leads 131 and 132 are directed toward the counter units and are connected to the circuit shown in FIGURE 3 at diode D8 and diode D9, respectively. Diode D5 is directly connected between junctions Q2 and junction 122. Diode D2 is directly connected between junctions Q2 and 62. Resistor R17 is directly connected between junctions Q2 and 133. Resistor RP2 is directly connected between junctions Q2 and 134, the latter being formed by base B8 of transistor T8 and also by the connection of resistor RP5 thereto. Remaining terminal of resistor RP5 is connected to junction 51 as shown. Emitter E8 is directly connected by lead 135 to junction 17. Lead 136 is connected from collector C8 to the common terminal PR of the punch solenoid 229 hereinafter described. Junction Q3 joins diodes D3, D6, and D9, as shown. The remaining sides of diodes D3, D6, and D9 are respectively connected to junctions 80, 121, and to lead 132 which leads to the counter unit as previously explained.

Lead 141 interconnects diode D2 and junction 62. Resistor RP3 is disposed between junction Q3 and junction 143, with the latter being connected to base B9 of transistor T9 and also through resistor RP6 to junction 54. Emitter E9 of transistor T9 is directly connected by lead 144 to junction 21. Lead 145 interconnects electrical contact 146 of pushbutton R1 and arm 147 of pushbutton O1. Lead 148 is directly connected to collector 149 of transistor T9 and to the terminal P0 (shown twice) of the punch solenoid 230 hereinafter described. Power supply PS includes a 12-volt terminal 150 which is connected by lead 151 to junctions 152 and 153 and also to arm 154 of start relay SR. Start relay SR includes relay contact sets 1SR, 2SR, and 3SR. The sets 1SR–3SR are normally open, closing only upon the energization of relay winding 155. Lead 156 interconnects junction 27 with contact arm 157. Arm 158 is connected by lead 159 to junction 160. Contacts 161, 162, and 163 are respectively connected by lead 164 to junction 165, by lead 166 to arm 167 and by lead 168 to junction 169. Lead 170 interconnects junctions 169 and 171. Lead 172 interconnects junctions 171 and 173. Lead 174 interconnects junctions 28, 175, 176, 177, and arm 178 of paper position sensor switch 242. Junction 179 is connected by lead 180 to junction 181. The latter is directly connected through lamp 182 to junction 183. Lead 184 interconnects junctions 183 and 171. Contact 185 is connected by lead 186 to junction 183. Contact arm 187 is directly connected to the junction 160 as shown. Lead 188 is connected at one end to junction 160 and wraps around core 189 of relay SR for connection to junction 153. Lead 190 is connected to junction 181 and wraps around core 191 of the core of tally counter TC, to be connected to junction 192. Lead 193 is disposed between junctions 194 and is connected at the remaining end to junction 192 after the same has wrapped around core 195 of tally relay TB. Relay contact 196 is electrically connected directly to junctions 197 and 192. Junctions 177, 197, and 176 are respectively connected to arms 198, 199, and 200 of tally relay TA. Lead 201 interconnects junction 179 and junction 202, medially being wound around relay core 203. Lead 205 interconnects junction 175 with pushbutton tally switch TPS at arm 206 thereof. Contact 207 of switch TPS is connected by lead 208 to junction 254 and thence via lead 253 to contact 252 of guard switch 251. Electrical lead 210 interconnects junction 152 and terminal 211 of drive motor 212. Terminal 213 of drive motor 212 is connected by lead 214 to junction 215. Lead 216 is connected between junction 215 and relay contact 217. Junction 218 and junctions 219 and 165 are coupled together, and lead 220 series connected through the winding around the core 221 of release solenoid RS to contact 222. Electrical lead 223 interconnects junction 218 and junction 224. Leads 225, 226, and 227 respectively form respective windings for punch solenoids 228, 229, and 230 to proceed to points PD, PR, and PO hereinafter described. The plunger portions of punch solenoids 228, 229, and 230 proceed through respective parts of a writing platen 231 to punch the paper 237 of write-in roll 235 as hereinafter set forth. Speed reduction gearing intercouples drive motor 212 with takeup roll 234. Thus, a supply roll of paper 235 may be disposed for rotation about its axial shaft 236 such that paper 237 may roll over rollers 238 and 239 above platen 231 and underneath roller 240 to be wound upon take-up roll 234. A paper position sensor 241 is disposed adjacent paper 237 in a manner hereinafter described. Switch 242 is integrally related with sensor 241, and the switch arm 178 thereof is directly connected by lead 243 to junction 177. Switch contact 244 is directly connected between switch contact 247' and junction 215.

The writing piston 231 above described is covered by a cover 247 which may be supplied a hinge 248. The write-in cover 247 may only be removed upon the actuation of release solenoid RS. Thus, the solenoid will be supplied a detent 249 used engaging the solenoid plunger 221 or at least being stopped thereby. The cover 247 is attached to member 50 which keeps guard switch 251 closed when the write-in cover 247 is closed and/or locked by solenoid plunger 221. Member 50, in being attached to cover 247, operates such that when the cover 247 is lifted when released by solenoid RS, then guard switch 251 will open. Electrical contact 252 is connected by lead 253 to lead 208 through junction 254. Switch arm 255 is connected by lead 256 to junction 202.

The operation of the circuit of FIGURE 3 is as follows. It will be assumed that the power supply is on and that potentials of 12 volts, minus 6 volts, and ground return are available at terminals 150, 58, and 29, respectively. Prior to depression of start pushbutton SP, the start relay SR will not be energized. Thus, contact 161 and contact arm 154 of start relay SR are open, and hence, the 12 volt supply line is open so that there are present no 12 volt circuit paths, either through the transistor circuits or the electro-mechanical system, to ground. —6 volts at terminal 58 of power supply PS is available at electrical lead 46 (upper left portion of FIGURE 3) and all of the electrical junctions associated therewith so as to charge capacitors C1', C2 and C3 to a —6 volts through resistors R13, R14, and R15, respectively, to ground at junction 22 with all other similar resistors. The negative 6 volts are also supplied to the base of each of the transistors T1–T6, but these transistors remain non-conductive since the —6 volts is a back-bias voltage.

Assume now that a person presents himself to the voting judge who checks his registrations and qualifications to vote. The judge, upon finding satisfactory registration, and so forth, directs the voter to a particular voting booth. In the booth is a voting panel VP having electrical circuitry bracketed as VP in FIGURE 3. It will be mentioned at this point that each voting booth is supplied with a voting panel VP as illustrated in FIGURE 3. Once the voter is qualified by the judge, then the voting judge presses with his thumb or finger the start pushbutton SP which is physically located in the desk unit DU on the voting judge's table. Upon depression of start pushbutton SP the start relay SR becomes energized, as junction 153 is at 12 volts potential and ground is supplied the other side of the start relay winding through the start pushbutton SP, so as to produce the closing of arm and contact 154 and 161, thus supplying 12 volts to junction 219 and to the collector circuits of transistors T1–T6, and all other similar transistors. The energization of relay SR also closes arm 158 and contact 163. The circuit associated with the latter locks over the contacts of start pushbutton SP so that start relay SR remains energized when, upon removal of the thumb or finger, the start pushbutton under its spring action returns to open condition; thus, it will be seen that the circuit of the relay contact set 3SR, i.e., arm 158 and contact 163, locks the relay SR in energized condition. Relay contact set 3SR supplies two grounds to relay SR, i.e., arm 158 and contact 163, locks the relay SR in energized condition; thus, it will be seen that the circuit of the relay contact set 3SR, i.e., arm 158 and contact 163, locks the relay SR in energized condition. Relay contact set 3SR supplies two grounds to relay SR, i.e., through the normally closed contact set TB3, which are normally closed, of tally relay TB to ground and in parallel through the normally closed contacts 244, 178 of paper position sensor switch 241 to ground. The start relay SR also prepares a locking ground path for tally relay TB which operates at a later time over SR relay contacts set 2SR. The start relay SR also connects the 12 volts to one side of the on lamps ON, to one side of the winding of tally relays TA and TB, and, further, connects 12 volts to all of the 12 volt leads 12VC, all of this through relay contacts set 1SR.

Connection of 12 volts to all of the leads 12VC performs the following functions: (1) operates release solenoid RS so as to allow the write-in cover or lid 247 to be opened. (2) connects operating power (12 volts) to all of the punch solenoids, hereinafter to be described, in the "write-in" unit (also to be described)—but note that the punch solenoids do not operate at this time, (3) energizes the "off" side of all the bi-stable multivibrators (flip-flops) in the panel, i.e., the non-lamp side. These multivibrator or flip-flop circuits are indicated at D1, R1, and O1 in FIGURE 3, each of the same being identical and being a novel, two-stage transistor circuit.

That the flip-flop circuits D1, R1, and O1, do not energize in the "off" state of condition is assured by two factors: (1) Initially the direct current resistance of lamps L1, L2, L3, is very low, thereby causing a more rapid rise in voltage at collectors C2, C4 and C6 (and bases B1, B3, and B5) so as to favor that side to be "off" or transistors T2, T4, and T6 to be nonconductive, i.e., cut off; (2) the second factor is the presence of capacitors C1', C2 and C3 and their initial negative charge which holds bases B2, B4 and B6 at a negative potential so as also to keep transistors T2, T4, and T6 in a cut-off state. Rather than NPN transistors, PNP transistors, or even vacuum tubes may be used at T1–T6 in the three flip-flops (bi-stable multivibrators) shown, as here where the voltage dividers (e.g., R7, R10) are provided so long as feedback from the output circuits of each stage ( amplifier, e.g., T1) to the input circuit of the associated stage (amplifier, e.g., T2) keeps output to a minimum and, where the unique capacitor feature is used, where capacitor (e.g., C1) is coupled between any constant potential and either the input or output circuit of its associated amplifier (e.g., T1).

Let there now be examined the state of a representative one of the flip-flop circuits (D1, R1, and O1) and its "off" condition. A near 12-volt potential will be present at junction 60, and this potential forms a current path from the 12-volt line 12VC (assuming normally closed erase pushbutton EP is closed) so that the path, through lamp L1 and resistor R7 to the base B1 of transistor T1, will cause transistor T1 to conduct, or saturate. In the saturated condition, transistor T1 acts as a switch, effectively closing collector T1 and emitter E1. This means that collector C1 at junction 32 is near ground lead GND. Junction 32 is now the upper point of an effective voltage divider, with current flowing from this point to resistors R4 and R13 to the —6 volt bias lead B1. The junction of these two transistors at 59 is directly connected to base B2 of transistor T2. The effective voltage divider tends to hold this respective point at about —1 volt, which back-biases the transistor T2 and maintains it in its cut off state. All flip-flops circuits of the voting panel are initially in this state.

The pushbuttons D1, R1, and O1 are for the selection by the voter of a particular candidate from political party D (Democrat), R (Republican) or O (Other), for a particular political office "1." Suppose that for a particular political office, say Mayor, the voter depresses push button D1 to select the "D" candidate for office "1" (the office 1 corresponding to Mayor). Ground may be traced back through all of the normal (undepressed) pushbuttons to normally closed contacts #1 of tally relay TA via junctions 175 and 28 to the ground terminal 29 of the power supply. Note the preference circuit which allows the ground to be sent to the base of only one transistor at a time of the respective flip-flop circuits. As the D1 pushbutton is pressed, ground potential is supplied to base B1 of transistor T1. This prevents any current flowing into the base of transistor T1; hence, transistor T1 ceases to conduct or cuts off. Upon the ceasing of conduction of transistor T1, collector 32 raises in potential to near 12 volts, thus raising the potential of junction 59, the junction between resistors R4 and R13 so as to apply an increased base voltage to base B2 of transistor T2. Thus, current now flows into base B2 through resistors R1 and R4, causing transistor T2 to conduct. This action causes lamp L1 to light and collector C2 to come near ground in potential. Now the voltage divider consisting of resistors R7 and R10 causes a negative potential to be maintained at base B1 of transistor T1, holding it in a cut off state. The flip-flop is now in the "on" condition and no other action takes place upon the releasing of the D1 pushbutton.

Assume now that the voter wishes to change his vote, prior to recording thereof, from candidate D to candidates R or O, for political office vote "1." Assume that he desires to select candidate O for office "1," then he presses the O1 pushbutton, and the same action takes place in the O flip-flop as decribed in the preceding paragraph in connection with flip-flop D1, and lamp L3 lights. With transistor T5 cut off, collector C5 is at a high potential. Collector C5 is connected through resistor R3–1 to junction 33 and from thence to base B1 of transistor T1  making transistor T1 to begin to conduct. This action makes the B1 flip-flop turn to the "off" state. Note that the interconnection between all of the transistor collectors C1, C3, C5 and transistor bases B1, B3, B5 permits only one flip-flop to be "on" at a time. Hence, it is impossible to vote for more than one candidate for an office at a time with these particular connections. Pressing the R1 pushbutton causes lamp L2 to light and prevents either of the D1 or O1 flip-flops from being in the "on" state.

Assume now that the voter has pressed one of three pushbuttons R1, D1, O1 and decides that he does not want to vote for any of the three candidates to this particular office. He then presses the erase pushbutton EP, which removes line 12VC carrying 12 volts from all of the three flip-flop circuits D1, R1, O1. This turns any lamp L1, L2, L3 previously lit off and allows capacitors C1, C2, C3 to charge to a negative voltage. When the erase pushbutton is released, the condition is as described prior to the depression of any pushbutton D1, R1, O1, and after the start relay is operated and all three flip-flops energize to "off" condition.

Thus far there has been discussed the electrical circuit for a particular office "1." Identical circuits will be had for additional offices on the ballot. Thus, if there are offices "N" on the ballot there will be "N" circuits which are individually identical with the circuit associated with office 1. The 12VC, GND, —6V, and tally ground leads will be supplied to each of the respective office circuits.

The voter presses pushbuttons for the candidates of his choice in any or all of the office circuits, changing and erases as he desires. When he has the appropriate lamps lit as he desires, then he may press the tally pushbutton. The tally pushbutton is designated as TPS at the lower portion of FIGURE 3. The result of this action is best described by calling attention to the gate circuits of each office flip-flop. As an example, note diodes D1, D4, and D7 associated with flip-flop circuit D1. See also resistor R16 under the D1 flip-flop. Resistor R16 is connected to 12 volts, via line 12VC, to junction 35, and current flows through it to junction Q1. Current flow from this point depends on several conditions. Because of the direction of diode connection as shown, current will flow to the most negative or lowest voltage below the positive 12 volts of line 12VC. This is true because if the effective cathode of any diode is higher in potential than another, current would have to flow backwards through this diode in order to flow at all, and this is not possible. Hence, current flows only to the most negative effective cathode of diode D1, D4, and D7. Note that diode D1 is connected to collector C1 of the D1 flip-flop, diode D4 is connected to a common lead which leads to ground through the normally closed contact set TB1 of tally relay TB. Diode 7 is connected to a transistor amplifier in the counter unit, hereinafter described, which is similar to the transistor circuit immediately connected to junction Q1 in FIGURE 3. Now if the ground is removed from the effective cathode of diode D4, current flow from point Q1 will depend on the state of D1 flip-flop. If this flip-flop is in "off" condition, then current will flow through diode D1 to collector C1 which is near ground. If flip-flop D1 is in "on" condition, then current will flow to both TR1 (punch solenoid) and counter transistor amplifiers (hereinafter explained), to one from junction Q1 and to the other through diode D7. It will soon be perceived how ground is removed from the effective cathode of diode D4 and all other similar diodes in all other office gates. Obviously, current flowing from any one of the Q (i.e., Q1, Q2) junctions depends upon the state of the associated flip-flop circuit, the dependence being that the transistor amplifiers (counter and punch solenoid) will be actuated only if the associated flip-flop is in the "on" state.

Assume now that the voter presses the tally pushbutton, which is designated as TPS. If the guard switch at 251 is closed, then current flows from the 12 volt line 12VC through the winding of tally relay TA, through the closed contacts of the guard switch at 251, and from there to the closed contacts of the tally pushbutton TPS to ground. The tally relay TA operates and performs the following functions: (1) locks operating over its own TA3 contacts and releases the release solenoid RS when the TA3 contacts open, (2) prepares an operating path for tally relay TB over the contacts set TA2 (3) removes ground from the panel pushbuttons when the TA1 contacts of tally relay TA open so as to prevent further voting changes and thus ultimately sends ground over the normally open TA1 contacts to the A lead which leads to the counter unit hereinafter described. This ground actuates the circuit in the counter unit which will return a sequence ground on the B lead to this circuit in a time-shared fashion with other voting panels, as hereinafter described. When this ground is return over the B lead, the current flows from the 12 volt 12VC lead line through the winding of the tally TB relay, through the operated TA2 contacts of tally relay TA to ground on the B lead. The tally TB relay operates and performs the following: (1) Opens one of the parallel operating paths (i.e., locking) paths for the start relay SR when the TB3 contacts open but the start relay SR remains operated over the ground supplied by the paper position sensor switch 241. (2) Locks operated over its own TB2 contacts and returns a ground on the B lead. (3) through the TB1 contacts starts the drive motor in the write-in unit, hereinafter described, removes the ground from all gates of the panel, thus allowing current to flow to the transistor amplifiers (punch solenoid and counter) under control of the state of the individual flip-flop. Removal of this ground causes operation of the counters associated with the "on" flip-flop units hereinafter described, and the punch solenoids associated with the same "on" flip-flops in the write-in unit, also hereinafter described. Actuation of the drive motor causes movement of the write-in ballot paper and operation of the paper position sensor switch at 241. The ballot paper or write-in sheet means 237 is perforated on one edge at 237' and at intervals corresponding to each ballot. The perforation 237' is aligned with the roller of paper position sensor switch extension 241'. The switch releases when aligned with a perforation. This switch, in operating, places a holding ground on the drive motor and removes the last locking ground for the start relay which releases. The drive motor continues until the ballot is in place for the next voter. The start relay releases and allows all relays to the voting panel to release, turns out the ON lamps and releases the tally counter which operates in parallel with the tally TB relay. Free operation of the start relay SR is impossible until the paper ballot has positioned itself for a new ballot and the paper position sensor switch 242 releases.

Figure 4:
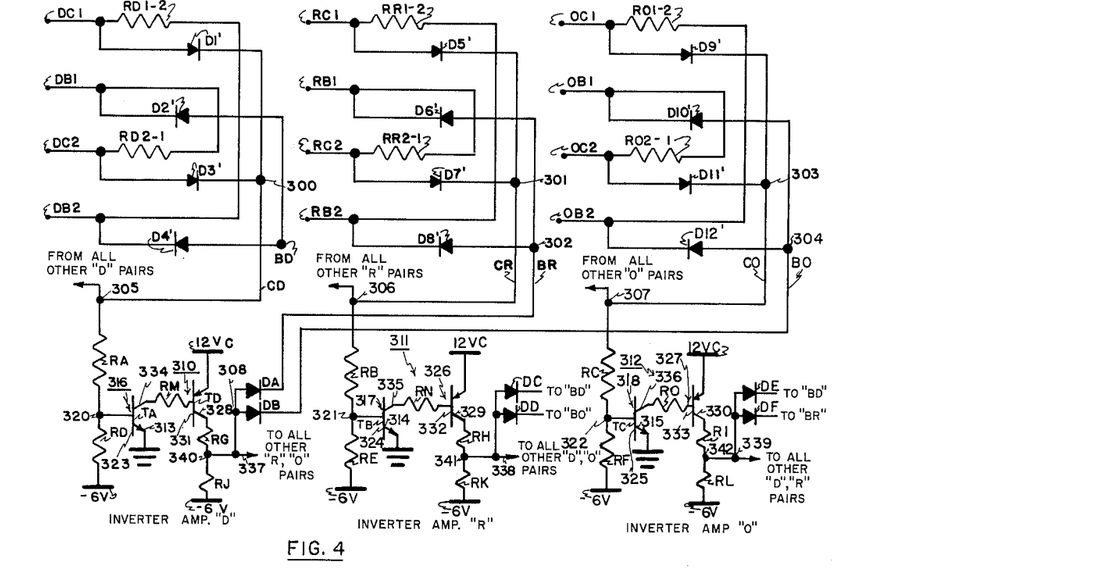

The circuit of FIGURE 4 will now be considered. In the event that a different interconnecting arrangement is desired in the office circuits; that is, other than the inclusion in FIGURE 3 of resistors R1-2, R1-3, R2-1, R2-3, R3-1, R3-2, wherein in one out of three candidates per office is selected, the substitution of FIGURE 4 for the above resistors and their circuits is used. FIGURE 4 typifies the arrangement utilized when two candidates in the same party must run for the same office as in primary elections. This figure also indicates how party exclusion is obtained. "Party exclusion" will be understood to comprehend the situation when a person votes in a primary election, as in this instance, he is allowed to vote only for one party's candidates and only one of two candidates for one office. Hence, FIGURE 4 indicates a circuit which automatically excludes votes in any party other than the one for which votes are being cast.

In FIGURE 4 points DC1, DB1, RC1, RB1, OC1, and OB1 are indicated. These correspond to similarly designated points in the circuit of FIGURE 3. The circuit X1 of FIGURE 3, again, merely by way of example, will be considered the circuit for office No. 1. For office No. 2 there will exist an identical circuit, but with the existing points DC2, DB2, RC2, RB2, OC2, OB2, these points respectively corresponding in this (second) office circuit to the respective series of points previously enumerated for office circuit No. 1. As FIGURE 4 indicates, resistor RD1-2 is coupled between points DC1 and DB2. Resistor RD2-1 is coupled with points DB1 and DC2. Diodes D1' and D3' are connected to junction 300, and respectively lead at their opposite terminals to points DC1 and DC2. Correspondingly, diodes D2' and D4' are joined together at junction BD and are connected at their opposite terminals to points DB1 and DB2.

Similarly, resistor RR1-2 is coupled between points RC1 and RB2. Similarly, resistor RR2-1 is coupled between points RB1 and RC2. Diodes D5' and D7' join at junction 301 and are coupled at their opposite terminals to points RC1 and RC2. Correspondingly, diodes D6' and D8' join at junction 302 and are connected at their opposite terminals to points RB1 and RB2, respectively.

In a similar manner, resistor R01-2 is coupled between points OC1 and OB2. Resistor R02-1 is coupled between points OB1 and OC2. Juncture 303 forms the juncture of diodes D11' and D9', with remaining terminals of these diodes being directly connected to points OC1 and OC2. Correspondingly, junction 304 forms the junction between diodes D10' and D12', with the remaining terminals of these diodes being respectively connected to points OB1 and OB2. Leads CD, CR, and CO, are respectively connected to junctions 305, 306, and 307. The BO lead is coupled between junction 304 and junction 308, diode DB being interposed therebetween. Diode DA is interposed between junction 308 and junction 302, being connected to the latter by lead BR.

In the lower part of FIGURE 4 is indicated inverter amplifiers 310, 311, and 312. Emitters 313, 314, and 315 of transistors 316, 317, and 318 are maintained at ground potential. Respective resistor pairs RA and RD, RB and RE, RC and RF, form respective voltage dividers intercoupled between the —6 volt lead (designated —6V) and junctions 305, 306, and 307, respectively. Center junctions 320, 321, and 322 are directly connected to bases 323, 324, and 325, respectively. Transistors 310, 326, and 327 have their emitters coupled to lead 12VC and its 12 volt potential, their collectors 328, 329, and 330 connected to the upper terminals of voltage dividers consisting of resistor pairs, RG, RJ; RH, RK; and RI, RL, respectively. Resistors RM, RN, and RO are respectively connected between bases 331, 332, and 333, and the respective, associated collectors 334, 335, and 336. Leads 337, 338, 339 are respectively connected to junctions 340, 341, and 342 of the voltage divider circuit previously mentioned, and lead to all other "R," "O"; "D," "O"; and "D," "R" pairs of circuits, respectively, for all necessary upper portions of FIGURE 4. There is just one set (of three each) of inverter amplifiers for each voting panel.

It is to be noted that point DC1, common to the collector of transistor T1 of FIGURE 3, is connected through resistor RD1-2 to point DB2, the base of the transistor R1 (not shown) of the D1 flip-flop of office circuit No. 2. Thus, if the D1 flip-flop of office circuit No. 1 is on, the D1 flip-flop of office circuit No. 2 cannot be on. It is to be noted that the interconnections of FIGURE 4 are arranged in a similar manner for each pair of office circuits such that in any one pair, only one flip-flop can be on at any one time. It is to be noted that there is a "C" (i.e., CD, CR, CO) lead common to all such circuits, which "C" lead connects to the collector circuits of all respective party flip-flop circuits in the manner of the above description, and this through the respective diodes indicated. If any flip-flop circuit in any party is turned on, then current flows from the 12VC, 12 volt line through the resistor in the resistive leg of that flip-flop, through any diodes similar to diode D1 in FIGURE 4, through a resistor similar to resistor RA of FIGURE 4 to the base of transistor 316. This causes saturation of this transistor and subsequent amplification through transistor 310 and results in current flow from the 12VC, 12 volt line, through transistor 310, through resistor RG, through diodes DA and DB to all bases of the left transistor in each office circuit pair, causing them to turn to the "off" state. This prevents any office flip-flops of any party from being "on" other than the office flip-flops in the party for which votes are being cast.

Figure 5:
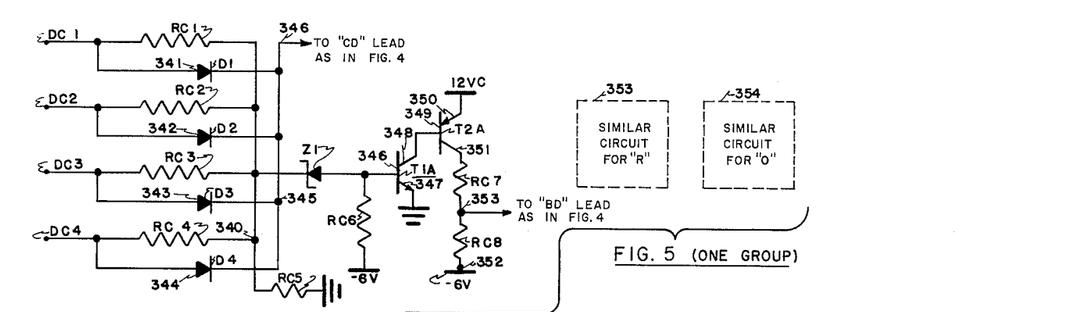
FIGURE 5 is an alternate circuit to that of FIGURE 4 wherein by utilizing the circuit of FIGURE 5 in lieu of a portion thereof in FIGURE 3, the FIGURE 3 circuit may be adapted to accommodate party exclusion and to permit a voter to vote for a certain number of candidates for primary office in a primary election.

FIGURE 5 illustrates a circuit arrangement which is alternate to that shown in FIGURE 4, and is a circuit substitution in lieu of that portion of the circuit of FIGURE 3, previously delineated with reference to FIGURE 4. In FIGURE 5 typical connections are shown for leads C, B for party exclusion and four, for example, candidates for primary office.

The FIGURE 5 circuit is basically the same as that of FIGURE 4, excepting that it allows for two out of three, one out of three, two out of four, and so forth, votes for the same office. This is useful for the school board portion of the ballot where non-partisan votes are allowed for several new members of the school board. Resistors RC1, RC2, RC3, RC4 form a summing network with resistor RC5. Points DC1, DC2, DC3, DC4 refer to points similar to DC1 in the office circuit number 1 which are found in respective office circuits Nos. 1 through 4. Resistors RC1, RC2, RC3, and RC4 are circuit paths for points DC1, DC2, DC3, and DC4 which are common to the resistor junction 340, with resistor RC5 leading to ground. Diodes 341 through 344 are intercoupled between junction 345, leading to lead 346 which is directed to the respective inverter amplifier as in FIGURE 4 or point 305. A Zener diode Z1 is interposed between junction 340 and base 346 of transistor T1A. Emitter 347 is maintained at ground potential, and collector 348 is directly connected to base 349 of transistor T2A. The emitter 350 is directly connected to the 12VC line (12 volts) and collector 351 forms the top terminal of a voltage divider comprised of resistors RC7 and RC8. Terminal 352 of this voltage divider network is maintained at the —6 volt potential heretofore mentioned. The medial tap 353 leads to the "BD" lead as in FIGURE 4. Block diagrams 353 and 354 in FIGURE 5 merely indicate there will be similar circuits to that shown with reference to the party D side for "R" and "O."

In explanation, again, resistors RC1–RC4 form a summing network with resistor RC5. Since the conduction of transistor T1A takes place when the base potential thereof becomes something over the potential of the emitter, i.e., when the voltage of the summing junction of the five resistors reaches a point where the sum is above the voltage drop of the Zener diode Z1, then transistor T1A conducts and causes transistor T2A to conduct also. And current then flows from the 12VC line through transistor T2A, through resistor RC7 to the BD lead of FIGURE 4, as an example. This causes all office flip-flops in this group to turn off, signifying that the voter voted for more candidates for this office than he was allowed to do. He may then vote again for the correct number. Note that party exclusion is also provided in this circuit utilizing the inverter amplifiers of FIGURE 4.

Returning now to FIGURE 3 it is seen that in geographical areas where the privilege of write-in candidates is allowed, the circuit of the invention will include the platen and related physical system generally indicated in the lower right hand corner of FIGURE 3. Further, also included is a permanent record of the votes cast on the voting panel. The ballots are preprinted and furnished on a roll called a supply roll. This is designated 235 in the drawing. Enough ballots are on the roll to adequately care for the voters who could use the machine in one day. One ballot is used for each ballot cast whether or not the ballot is used for a write-in. The permanent record consists of holes punched by the punch solenoids in the ballot just above the space allowed for the write-in candidate. The circuit is inoperable until the release solenoid RS is operated by the operation of start relay SR in a manner previously described. If the voted decides to write-in, he lifts the cover or lid at 247 and writes in the candidate's name. He is instructed not to vote for anyone else for that office for which he writes in a candidate's name. If he does so, a punched hole appears over the written name which obviously cancels his ballot. After the voter completes his write-in, he must close the cover before pushing the tally button. Pushing the tally button with the cover open results in no action being taken to record his ballot, since the operating path for tally relay TA is through the guard switch 252 which closes only upon closure of the cover. Once the tally pushbutton TPS is pressed, the cover is locked in place by the release of the release solenoid. This action follows the description of FIGURE 3. It is to be noted that the punched holes above referenced are produced by the actuation of punch solenoids PD, PR, or PO indicated in FIGURE 3. Even in the absence of a write-in procedure the punch solenoids may be used in an identical set up to produce a punched tape giving a permanent record of the ballots cast. The leads PD, PR, and PO at the bottom right of FIGURE 3 lead to the punch solenoid transistors T7, T8 and T9 shown in the upper part of the figure at the collector circuits thereof.

Figure 6:
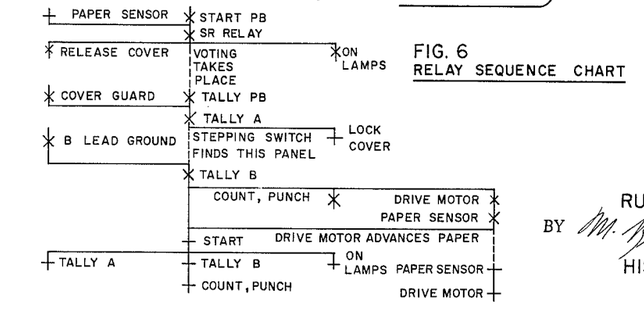
FIGURE 6 is a relay sequence chart indicating the times of operations and certain other features of the relays and associated equipment in connection with the practicing of the present invention, and particularly refers to the operating circuitry of FIGURE 3.

FIGURE 6 consists of what is known as a sequence chart. It is a time-action sequence of relay operations and releases, and also indicates the actions and relative times of certain other functions. The X's represent actions or operations and the —'s represent their complement, or releases. The chart is read as follows: The start pushbutton operates the start relay SR if the paper sensor 241 is off; start relay SR operates the release cover solenoid RS, the "on" lamps ON and allows voting to take place; the tally pushbutton TPS operates tally relay TA if the cover guard switch 252 is closed. The tally relay TA releases the cover solenoid and actuates a stepping switch in the counter unit, hereinafter described, which electrically "finds" this voting panel among others; the stepping switch operates tally relay TB by placing ground on the B lead; the tally relay TB causes counting and punching and the operation of drive motor 212; drive motor 212 operates the paper sensor switch 241 which continues the operation of the drive motor and releases the start relay SR; the release of start relay SR causes release of all relays and the drive motor continues until the paper sensor switch 242 releases so as to stop the drive motor 212.

Figures 7, 8:
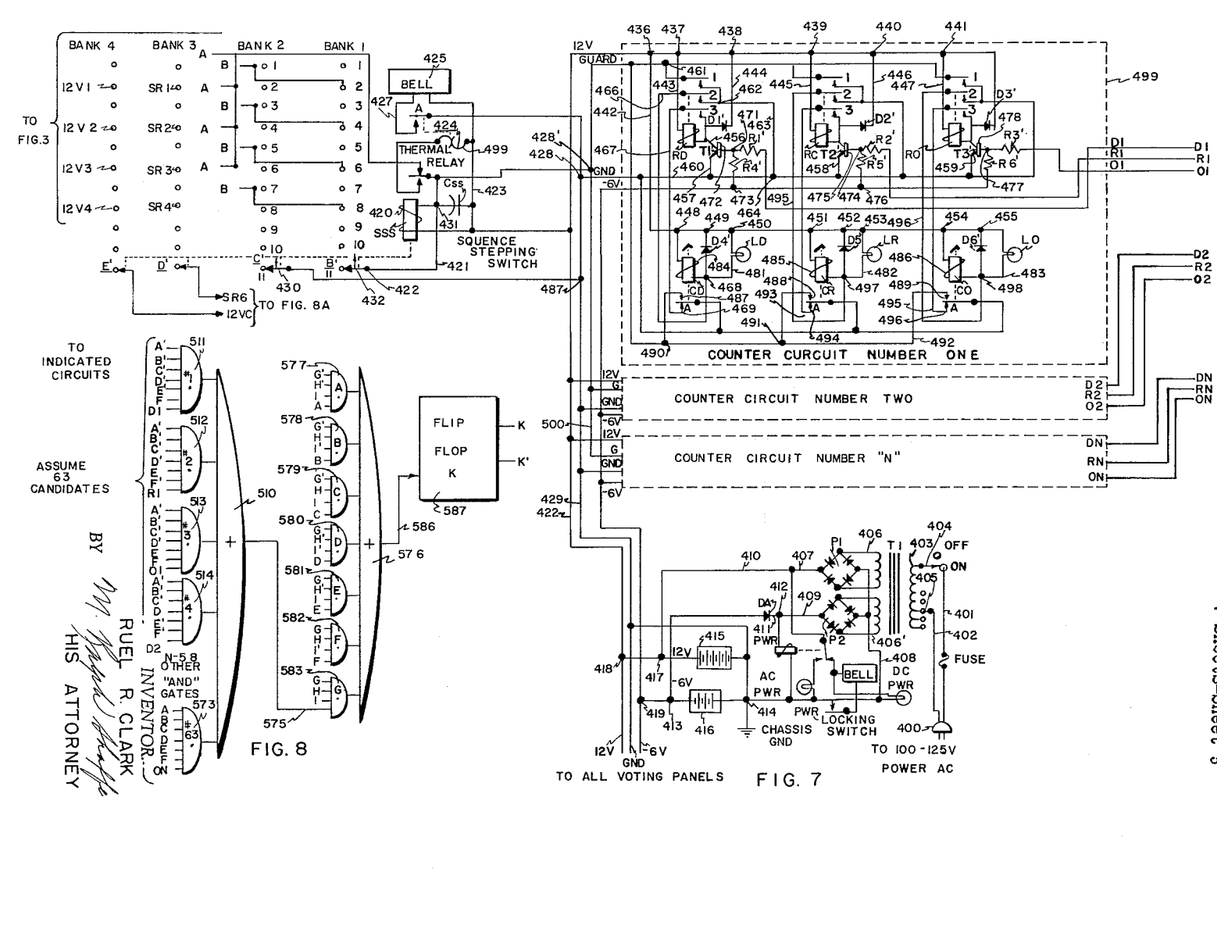
FIGURE 7 is a schematic diagram of a representative power supply which may be used in the present invention together with a counter and sequential sampling circuitry which sequentially senses the voting panels connected to the particular system.
FIGURE 8 is in block diagram form, represents an alternate to the upper half of FIGURE 3 relating to the counters, and is itself a block diagram of the output portion of the system circuitry wherein electrical conditions of voting panels of respective voting districts are sampled and information processed in a computer stage so various results may be obtained.

In FIGURE 7 input plug 400 is adapted for coupling to a suitable alternating current power source and is connected by leads 401 and 402 across transformer primary winding 403 of transformer T1. Suitable switches 404 and 405 may be included for on-off and line adjustment functions, respectively. Secondary windings 406 and 406' are connected across conventional diode bridge rectifier circuits P1 and P2 from which are provided output leads 407, common lead 408 and lead 409, leads 407 and 409 being connected to leads 410 and 411, respectively. Diode DA is interposed between junction 412 and junction 413. A chassis ground is picked up at 414 which is common to ground lines GND. Batteries 415 and 416 may be included between the chassis ground and junctions 417 and 413, respectively. Thus, 12 volt, −6 volt, and ground lines are supplied for all voting panels. The 12 volt and −6 volt battery terminals are directly connected to the 12 volt and −6 volt lines by junctures 418 and 419. Winding 420 of the core of sequence stepping switch SSS is shunted by capacitor CSS and is connected by lead 421 to junction 422 and by lead 423 to the thermal relay 424 and bell 425. The remaining side of bell 425 is connected by lead 427 through the normally open contacts A of thermal relay 424 to junction 428. Junction 428 is connected to GND by lead 429 as shown. Junction 428 is also connected to arm 430 of the sequence stepping relay switch SSS. Correspondingly, junction 431 is connected to the arm 432 of the sequence stepping switch SSS. Banks 1 and 2 are indicated as are also their connections to the respective leads A, B respective pairs of which lead to each voting panel. For convenience of illustration, only four sets are shown.

Common to the 12 volt lead are junctions 436–441 to which are respectively connected leads 442–447. Junctions 448–455 are common to lead 442. Lead 443 constitutes the core winding of relay RD which is connected to collector 456 of transistor T1'. Emitters 457–459 are common to the ground lead 460. Contact set No. 1 of relay RD is coupled between junction 461 and junction 462, the latter of which is also formed by the joining together of one side of both sets, Nos. 1 and 2, of the relay contacts of relay RD. Lead 463 is coupled between junction 462 and ground junction 464. The left sides of contact set Nos. 2 and 3 of relay RD are connected by leads 466 and 467 to contact 468 and junction 469, respectively. Junction 471 of resistors R1' and R4' is directly connected to base 472 of transistor T1', with remaining terminals of resistor R1' and R4' being respectively connected to the D1 lead path and also to junction 473. Correspondingly, junction 474 of resistors R2' and R5' is directly related to base 475, with remaining terminals of these resistors respectively leading to the R1 lead path and also to junction 476. Further, the junction 477 of resistors R3 and R6 is directly connected to base 478 of transistor T3, with the remaining terminals of the resistors R3 and R6 leading to lead path O1 and also to junction 476.

Leads 481, 482 and 483 are disposed in a common parallel circuit with the counter relay windings and lights 484 and LD, 485 and LR, and 486 and LO, respectively. Diodes D4', D5' and D6' shunt respective lights LD, LR and LO. Relay contacts 487–489 are directly connected to junctions 490 and 491 of lead 492. Lead 493 is coupled between contact 494 of the arm of contact set No. 3 of the RC relay. Lead 495 is directly connected to contact 496 and the arm contact of set No. 3 of the RO relay. The arms of contact set No. 3 of the RD, RC and RO relays are respectively connected by respective leads 467, 493 and 495 to contact 468, 494, and 496, respectively. Dotted line 499 circumscribes the counter circuit No. 1 correlating with the panel circuits in FIGURE 1. Counters CD, CR and CO are indicated. As leads D1, R1 and O1 lead from counter circuit No. 1 and are common to all panels in voting booths, so leads D2, R2 and O2 of counter circuit No. 2, identical to counter circuit No. 1, will be common likewise to all voting panels. The number of counter circuits present will correlate with the number of office circuits, for example, of each panel.

In FIGURE 6 the operation is as follows. When any of the voting panels in the voting district ground an A lead (the upper left side of FIGURE 7), the sequence stepping switch SSS operates through its own normally closed contacts. Note that the ground is supplied through the A lead through one side of the stepping switch relay winding 420, whereas the other side of the winding is directly connected to the 12 volt line.

Thus, current flows from 12 volts through the winding in the stepping switch and through the closed A contacts to ground on any of the A leads. Capacitor CSS is also charged at this time. Stepping switch SSS energizes and operates and thus opens its own operating path. As its contacts open, the capacitor discharges through the winding so as to delay the release of the stepping switch, thus insuring complete operation. As the stepping switch SSS releases, it causes wiper contacts D', E', B' and C' to step from one position to the next. The release also closes the operating path and re-energizes the stepping switch SSS. It again steps to another position. This continues until point A is connected to B' lead corresponding to the A lead which is causing the stepping of the switch. This supplies ground to the B lead and actuates the TR relay in the voting panel which immediately returns ground on the same B lead. When the stepping switch has stepped to the position previously described, the wiper arm B' comes in contact with this grounded B lead and holds ground on the winding of the stepping switch but does not release this time even though its own contacts open. Thus, the stepping switch SSS is not removed from this position until ground is removed from the associated B lead which, when it does occur, signifies successful operation of the panel. It is to be noted that as the stepping switch SSS operates, ground is imposed on the heating element 499 of thermal relay 424. 12 volts is connected to the other side of the element and, if the stepping switch remains on any one position beyond a certain time, bell 425 is sounded when the thermal relay expires.

When the stepping switch SSS connects ground to the B lead to the voting panel, this ground causes the action described for FIGURE 1. Thus, the D, R and O leads corresponding to the office flip-flops in the "ON" state are provided with a positive potential which is connected to the transistor amplifiers at T1', T2', and T3'. Assume, for example, that lead R1 is made positive. This causes transistor T2' to conduct which operates the RC relay. Current flows from 12 volts through the winding of the RC relay, through the T2' transistor to ground. Operation of the RC relay performs three functions: (1) It locks over its own contacts through the normal contacts of the CR counter to ground. This accomplished through the No. 3 contact set of relay RC. (2) It supplies ground to the winding of the CR counter over contact set No. 2. (3) It places ground on the guard lead 500 which aids in holding the sequence stepping switch on the associated position for the voting panel which is transferring information. Operation of the No. 2 contacts of the RC relay operates the CR counter which causes the numerical count of the counter to increase by one. Upon successful operation of the counter, its A contacts operate releasing the locking path for the RC relay and places another holding ground on the guard lead. As soon as the voting panel has completed its necessary action, positive potential is removed from the R1 lead and RC relay may release. This releases the CR counter which is returned to normal and resets for the next operation. Note that if either action fails, namely the voting panel or the counter unit circuits, the stepping switch is held operated thereby, thus actuating the alarm bell 425. Diodes D2″ and D5″ and other similar diodes are for arc supression purposes since the collapsing direct current field around the solenoids is provided with a respective path which eliminates arcing. Lamps LR and other similar lamps are used for trouble shooting purposes in cases where functions and relays do not function properly.

The power supply unit indicated at the bottom of FIGURE 7 provides 12 volts and −6 volts for all circuits on a continuous basis. Regardless of the condition of the outside alternating power, the voting unit receives power and is independent of outside power failures. This is due to the inclusion of the −6 and 12 volt battery supplies at 416 and 415. The PWR relay operates when alternating current power supplies current to charge the —6 volt battery, which lights the PWR lamps. If outside alternating power fails, the PWR relay releases, connecting 12 volts to the power bell which calls attention to the fact that outside power has failed, but it may be turned off by means of the locking PWR switch. Note that two lamps AC-PWR and DC-PWR correspond to the source of voting power. The line-adjust switch on transformer T1 allows for adjusting to local line voltages. In other aspects the power supply, the diode bridge circuits associated therewith, and the input are strictly conventional.

Figure 8A:
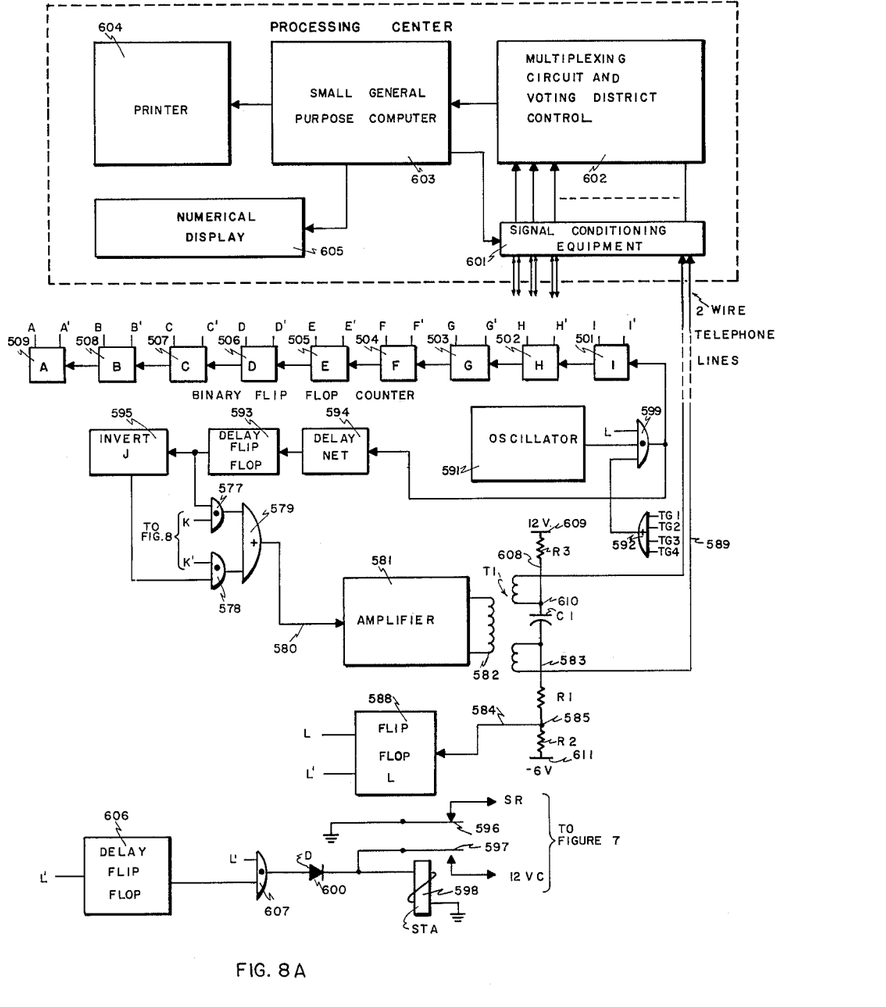
FIGURE 8A is a continuation of the circuits shown in FIGURES 7 and 8.

FIGURES 8 and 8A suggest the necessary circuitry and equipment to perform the function of transmitting the voting information from a number of voting districts to a central processing center. It comprises an oscillator 591 connected to an "and" gate 599, said "and" gate connected to the first flip-flop 501 of a nine bit binary counter 501–509, and delay network 594, said flip-flop outputs connected to "and" gates 511–573 and "and" gates 577–583 in such a conventional manner as to cause the output of each "and" gate to become "true" or "on" according to the table in FIGURE 8B. A secondary input to each "and" gate 511–573 comes from D1–D21, R1–R21, O1–O21 outputs of the voting panels of FIGURE 3. A secondary input to each "and" gate 577–582 is derived from flip-flops A–F and a secondary input to "and" gate 583 comes from "br" gate 510, said "or" gate 510 deriving its inputs from the outputs of "and" gates 511–573. The outputs of "and" gates 577–583 are connected to "or" gate 576, said "or" gate 576 connected by lead 586 to flip-flop K, 587, which has outputs of K and K', said outputs appearing at the inputs of "and" gates 577 and 578. These gates 577 and 578 have as secondary inputs the outputs of delay flip-flop 593 and inverter 595 respectively, the output of said "and" gates connected to the inputs of "or" gate 579, said delay flip-flop 593 having as an input the output of aforementioned delay network 594. "Or" gate 592 has as inputs the "Tally Ground" leads of all voting panels of FIGURE 3. Resistor R3 is connected at one end to 12 volts and 609, the other end of said resistor R3 is connected to one winding of transformer T1 by means of lead 608 to point 610 and to one side of capacitor C1 at 610. The other end of capacitor C1 is connected by means of lead 583 to one end of a voltage divider comprised of resistors R1 and R2. The bias side of the divider is connected to 6 volts at 611. Point 585 of the divider is connected via lead 584 to the input of flip-flop L, 588, said flip-flop 588 outputs appearing at the input of "and" gate 599, the input of "and" gate 607 and the input of delay flip-flop 606. The output of "and" gate 607 is connected via diode D, 600, to the winding of the STA relay 598 and to one side of the normally open contact 597 of said STA relay, the other side connecting to 12VC of the counter unit of FIGURE 8. Normally closed contact 596 of said STA relay is connected on one side to ground potential and on the other side to the SR lead of the counter unit of FIGURE 8. The output of said "and" gate 579 is connected by means of lead 580 to the input of amplifier 581, the output of said amplifier is connected to the primary of the T1 transformer 582. The secondary is connected to telephone lines 589 and thence to signal conditioning equipment 601 of the election center. The signal conditioning equipment 601 is connected to all other voting districts and to the multiplexing circuit 602, said multiplexing circuit 602 is connected to the digital computer 603, said computer 603 is connected to the printer 604 and the numerical display 605.

A detailed explanation of operating procedure will now follow.

The processing center 608 is programmed such that the computer 603 causes the multiplexing circuit 602 to constantly and repetitively scan, i.e., attach itself, one at a time, in sequence, through the signal conditioning equipment 601 to each voting district in sequence. The signal conditioning equipment 601 provides a closed circuit between the two telephone lines 589 under control of the computer 603 which causes current to flow from 12 volts at 609 through resistor R3 via lead 608 through one-half of the T1 transformer 582 out over one side of the line 589 through the closed circuit in the signal conditioning equipment, back over the line 589 through the other half of transformer T1 winding 582 through the aforementioned voltage divider to —6 volts at 611 thereby rasing the potential at 585 which potential is transferred via lead 584 to the L flip-flop which turns on. The output of the L flip-flop appears at the input of "and" gate 599. If there are no voting panels in the process of information transfer, the output of "or" gate 592 will be false or "off" and no output pulses from the oscillator 591 will appear at the first flip-flop of the binary counter I at 501. The processing center, after causing the closed circuit on the telephone line, awaits the return of pulses from the voting district. If no pulses are allowed to appear at the I flip-flop 501, there will be no pulses sent to the Processing Center as will be later explained. With no return of pulses, the computer removes the closed circuit on the telephone line causing the L flip-flop to turn off. The delay flip-flop 606 turns on with the release of the L flip-flop, the output of the delay flip-flop being connected to "and" gate 607 along with the L' output of the L flip-flop. This gate 607 causes momentary operation of the STA relay at 598 through control diode D at 600. The STA releases immediately since no voting panels are in the process of information transfer as will be explained later.

As the output of the L flip-flop is applied to "and" gate 599 and any voting panel is in the process of information transfer, gate 592 will allow pulses from oscillator 591 to appear at the input of flip-flop I at 501. This flip-flop changes state at one-half the oscillator frequency. The arrangement of the binary flip-flop counter 501–509 is such that each flip-flop is driven by and at half the frequency of the preceding flip-flop. The outputs of these flip-flops are connected to various inputs as shown in FIGURE 8A. Flip-flops G, H, I at 501, 502, 503 operate at the most rapid rate and go through a complete counting cycle while the other flip-flops do not change. "And" gate 577 comes "true" first if the input labeled A is true, such label A being derived from the true output of the A flip-flop at 509, "and" gate 578 comes "true" next if the input labeled B is "true" which label B is derived from the true output of flip-flop B and so on to "and" gate 583 which comes "true" if input Q is "true" which input is derived from "or" gate 510 via lead 575. "Or" gate 510 is fed by as many "and" gates as there are candidates on the voting panel. 64 candidates and "and" gates are assumed. Depending on the particular combination of flip-flops A through F, 509–504, one and only one "and" gate of the 64 will be true and this only if its associated D, R, or O input is true. Thus for one complete count of all counter flip-flops, there appears at the output of "or" gate 576 a binary code which is first a binary representation of the states of flip-flops A–F, 509–504, which representation corresponds to the code number for a particular candidate on the ballot and second a single binary pulse which is representative of the vote for that candidate. The output of "or" gate 576 is connected via lead 586 to flip-flop K at 587, the output of which is true or "on" for true input pulses and false or "off" for false or "off" input pulses. The oscillator 591 is also connected to delay net 594 which delays the oscillator output slightly, said delay net output connected to a delay flip-flop 593, said flip-flop sharpens and shortens the oscillator pulse and is connected to "and" gate 577 and to inverter 595 which inverts the polarity of the output of the delay flip-flop, the output of said inverter is connected to "and" gate 578. Flip-flop K has outputs K and K' connected to each of gates 577 and 578 respectively the outputs of said gates connected to "or" gate 579, the output of said gate connected via lead 580 to amplifier 581, the output of said amplifier connected through transformer T1 at 582 to the telephone line and hence to the computer at the processing center. Thus, the input to amplifier 581 may be either a pulse of one polarity or the other depending on the state of flip-flop K which is dependent upon the input data. When the computer is assured that it has recorded a complete ballot, it removes the closed circuit on the telephone lines. This releases flip-flop L, at 588 which stops pulsing and turns on delay flip-flop 606 which stays on long enough to operate relay STA at 598. Relay STA had been holding a ground at 596 on the SR relay winding of the voting panel being sampled through stepping switch SSS of FIGURE 7 but now releases that ground and locks over contacts 597 to 12VC in the same voting panel also connected through switch SSS. When the voting panel releases, relay STA releases.

The computer at the processing center interprets the data and verifies its accuracy by means of internal stored programs. It also may display the total count on display 605 or print the total count on printer 604.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

The voting machine circuits depicted in a general, block diagram manner in the upper left of FIGURE 1 and labeled "Voting District #1" are associated with any one particular district and are comprised of FIGURES 2, 3, 4, 5, 6, 7, 8, 8A and 8B and in fact comprise all figures except where noted otherwise. FIGURE 1 includes all other representative districts and the election center; FIGURE 8A includes a more detailed block diagram of conventional data processing equipment utilized at the election center.

The district circuits depicted in the above figures may be employed on a single voting district level with total counts from each individual register read and recorded at the end of the voting day by the respective judges assigned to the district. These totals are then transmitted to the election center by the judges, usually by telephone. The counts on the registers are retained unchanged for further reference. The election center then makes a grand total of the votes from all districts.

Figure 8B:
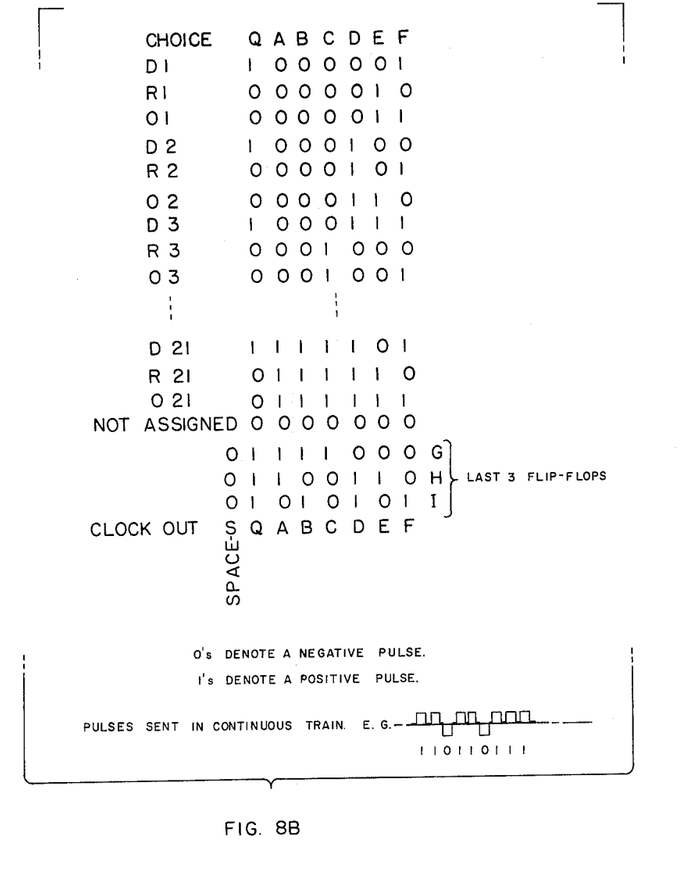
FIGURE 8B is a presentation, with an example, of a representative counting technique which may be used.

The circuits of FIGURES 8, 8A and 8B may be included to provide instantaneous transmittal of the results of each ballot cast to the election center where a computer continuously accumulates the votes cast during the voting day. The computer provides a complete display and print of all vote totals immediately upon the close of the last voting district. Modern data processing methods may be utilized at the election center to perform a variety of useful functions such as continuous checking of input data, statistical analysis of voting trends, comparison of current and past trends, and so forth.

I claim:

1. A voting machine including, in combination: A voting panel comprising a reset ballot and including plural, intercoupled, electronic, candidate selection circuits for a given political office, candidate selection push-button means coupled to said candidate selection circuits for effecting an electrical condition in a chosen one of said candidate selection circuits and for simultaneously cancelling any electrical condition of any remaining electronic candidate selection circuit for said political office which is inconsistent therewith; and tallying means for sensing and recording said electrical condition and for automatically returning said candidate selection circuits to equivalent preselection condition.

2. In a voting machine system including, in combination: A voting panel comprising a reset ballot and including electrical circuit means for effecting sensible, selected electrical conditions therein, respective indicia signifying voting choices, and multiple, manually actuatable switch means individually electrically connected in said electrical circuit means, physically disposed proximate respective ones of said indicia, and adapted for selection and actuation by a particular voter in voting for choices on the said ballot, for effecting discrete electrical conditions in said electrical circuit means, which discrete electrical conditions indicate those of the said switches which have been actuated by a voter in voting for the respective voting choices corresponding thereto; means coupled to said voting panel for supplying electrical power thereto; tallying means coupled to said panel, at said electrical circuit means thereof, for completing, sensing, and recording said discrete electrical conditions and for automatically returning said electrical circuit means to its original electrical condition prior to switch means selection; an improvement wherein said electrical circuit means includes plural, bistable multivibrators having input and "on" output circuits, the latter producing said discrete electrical conditions, said sensing and recording means being electrically coupled to said multivibrators at said "on" output circuits thereof, and the said switch means being respectively triggering said multivibrators to respective "on" condition when said switch means are in electrically closed condition, and means intercoupling a plural number of said multivibrators together so that when a predetermined number of said multivibrators are placed in said "on" condition the triggering of an additional multivibrator will result in an "on" multivibrator assuming an electrically "off" condition.

3. A voting machine system including, in combination: A voting panel comprising a reset ballot and including electrical circuit means for effecting sensible, selected electrical conditions therein, respective indicia signifying voting choices, and multiple, manually actuatable switch means individually electrically connected in said electrical circuit means, physically disposed proximate respective ones of said indicia, and adapted for selection and actuation by a particular voter in voting for choices on the said ballot, for effecting discrete electrical conditions in said electrical circuit means, which discrete electrical conditions indicate those of the said switches which have been actuated by a voter in voting for the respective voting choices corresponding thereto; means coupled to said voting panel for supplying electrical power thereto; means coupled to said panel, at said electrical circuit means thereof, for sensing and recording said discrete electrical conditions; and means for returning said electrical circuit means to its original electrical condition prior to switch means selection; said voting panel also including writing receiving sheet means for receiving a write-in, manually written impression, said sheet means including sensible perforation means, and means for sensing said perforation means of said sheet means for effecting utilizable write-in voting upon said sheet means.

4. Structure according to claim 3 wherein said sensing means comprises an electrical circuit controlling sensing switch means.

5. A voting machine including, in combination: A voting panel comprising a reset ballot and including plural, intercoupled, electronic, candidate selection circuits for a given political office, candidate selection means coupled to said candidate selection circuits for effecting an electrical condition in a chosen one of said candidate selection circuits and for simultaneously cancelling any electrical condition of any remaining electronic candidate selection circuit for said political office which is inconsistent therewith; and tallying means for sensing and recording said electrical condition and for automatically returning said candidate selection circuits to equivalent preselection condition.

6. Structure according to claim 1 wherein said electrical circuit means includes plural, bi-stable multivibrators having input and "on" output circuits, the latter producing said discrete electrical conditions, said sensing and recording means being electrically coupled to said multivibrators at said "on" output circuits thereof, and the said switch means being respectively electrically interposed in said input circuits for selectively triggering said multivibrators to respective "on" condition when said switch means are in electrically closed condition, and wherein said multivibrators each comprise two-stage transistor multivibrators having a pair of respective transistors each including base, emitter and collector, said transistor multivibrators being so constructed and arranged that the application of a common reference potential to the base of a respective one of said transistor pairs will trigger the respective multivibrator from "off" condition to "on" condition, said switch means comprising plural, single pole, double-throw switches having respective pairs of contacts, with a respective contact of one being electrically connected to the pole of the next adjacent switch, and with the poles normally contacting this respective contact, the pole of the last of said switches being connected to said common reference potential, the remaining contacts of said contact pairs of said switches being electrically connected to the said bases of said respective one transistors.

7. In combination, a plurality of candidate selection voting panels each capable of presenting a set of unique electrical conditions in accordance with unique candidate selection at said panels, respectively, and each including respective tallying means, and sensing means coupled to said voting panels and responsive to the respective tallying thereof to selectively activate said sensing means to register a voter's selections which were previously made on the selected voting panel.

8. Plural precinct, electronic voting machine equipment each including a plurality of candidate selections voting panels each capable of presenting a set of unique electrical conditions in accordance with unique candidate selection at said panels, respectively, and each including respective tallying means, and sensing means coupled to said voting panels and responsive to the respective tallying thereof to selectively activate said sensing means to register a voter's selections which were previously made on the selected voting panel; and central totalling equipment means coupled to said plural precinct equipment for scanning said equipment to total the votes thereof.

9. In a voting machine panel, plural means for voting for a given number of candidates, and means electronically intercoupling said plural means for rendering each of said plural means responsive to the condition of the remaining means such that the selection of one of said means automatically cancels a prior selection of another of said means.

References Cited by the Examiner
UNITED STATES PATENTS

| | | | |
|---|---|---|---|
| 1,142,058 | 6/1915 | Rugh | 235—54 |
| 1,170,731 | 2/1916 | Bohan et al. | 235—54 |
| 2,471,774 | 5/1949 | Powell | 235—52 X |
| 2,535,303 | 12/1950 | Lewis | 307—88.5 |
| 2,577,015 | 12/1951 | Johnson | 307—88.5 |
| 3,024,974 | 3/1962 | Hocker | 235—54 |
| 3,051,852 | 8/1962 | Minz et al. | 307—88.5 |
| 3,094,227 | 6/1963 | Wilcox et al. | 235—54 |
| 3,096,017 | 7/1963 | Wilcox et al. | 235—54 |
| 3,104,805 | 9/1963 | Holicky | 235—54 |
| 3,105,157 | 9/1963 | Norman | 307—88.5 |
| 3,108,743 | 10/1963 | Naugle | 235—54 |
| 3,125,289 | 4/1964 | Aronson | 235—54 |
| 3,162,362 | 12/1964 | Jazbutis | 235—54 |

LEO SMILOW, *Primary Examiner.*